Feb. 24, 1970    R. WATTS, JR    3,497,059
PACKAGE AND METHOD FOR MAKING SAME
Filed Feb. 9, 1967    6 Sheets-Sheet 1

INVENTOR.
RIDLEY WATTS JR.
BY
Watts, Hoffmann, Fisher & Heinke
ATTORNEYS.

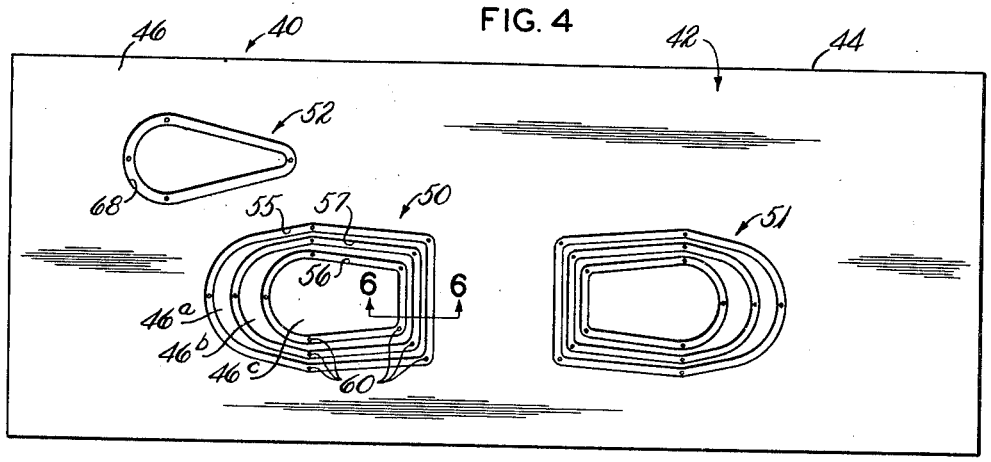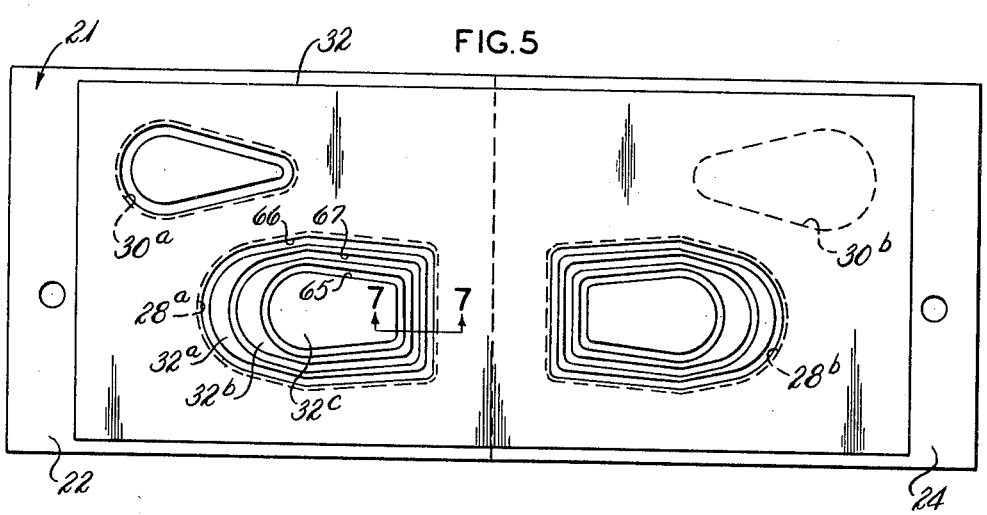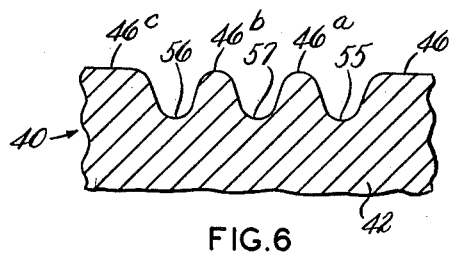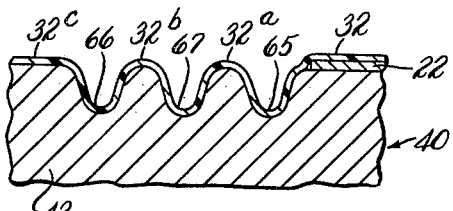

Feb. 24, 1970      R. WATTS, JR      3,497,059
PACKAGE AND METHOD FOR MAKING SAME
Filed Feb. 9, 1967                            6 Sheets-Sheet 3
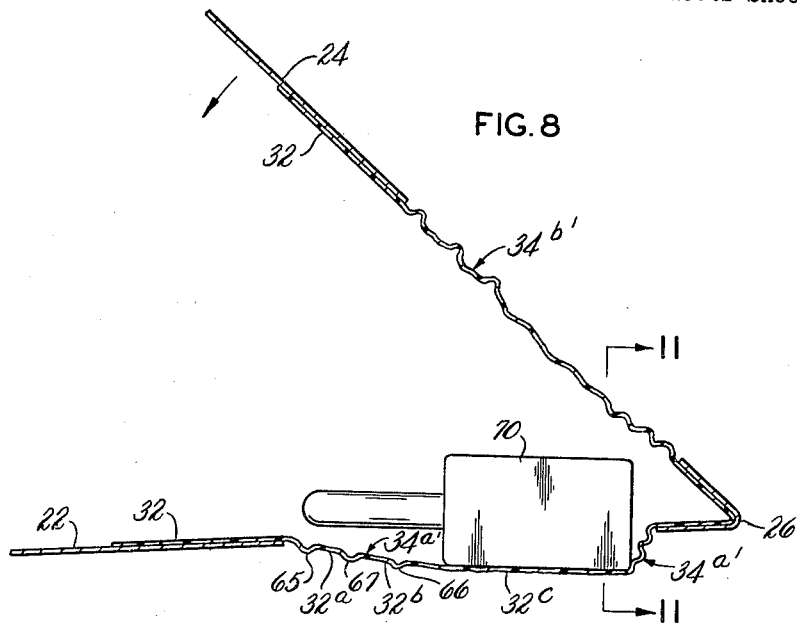
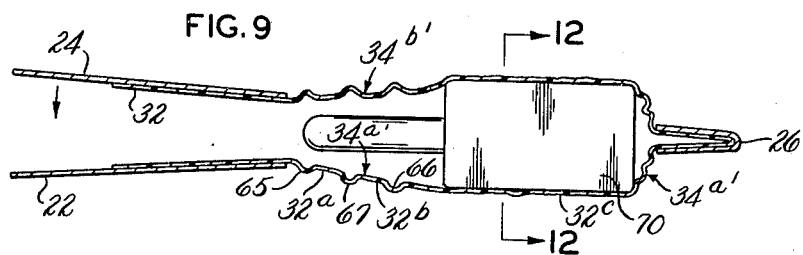
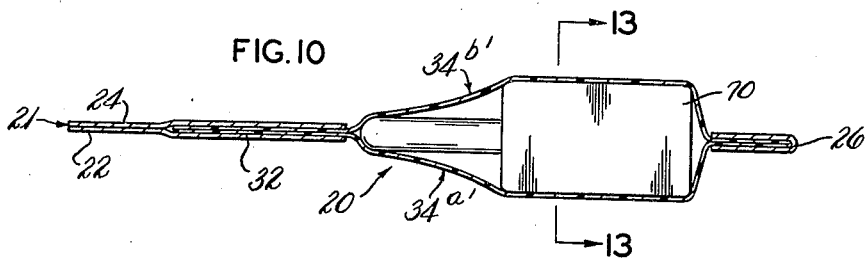
INVENTOR.
RIDLEY WATTS JR.
BY
*Watts, Hoffmann, Fisher & Heinke*
ATTORNEYS.

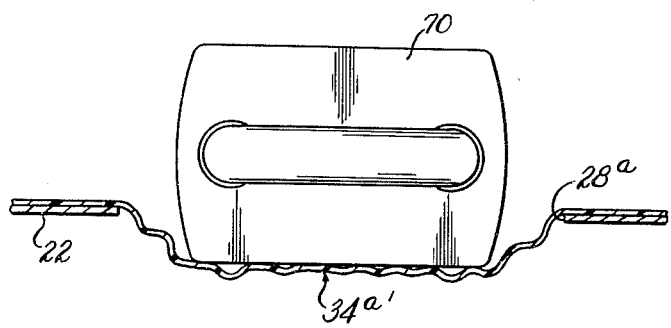
FIG. 11
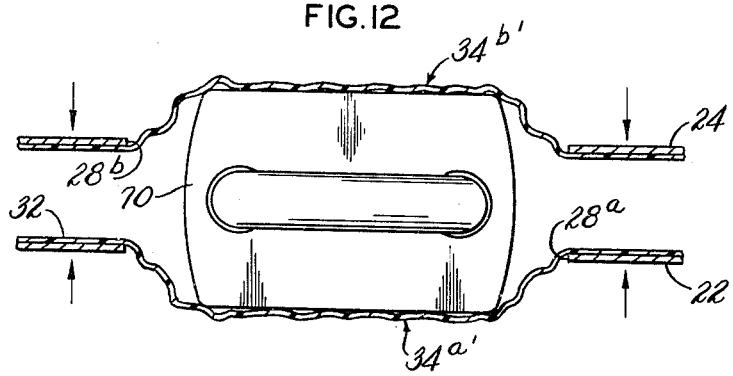
FIG. 12
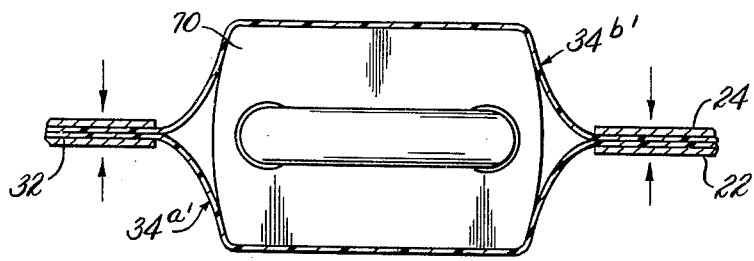
FIG. 13

INVENTOR.
RIDLEY WATTS JR.
BY
*Watts, Hoffmann, Fisher & Heinke*
ATTORNEYS

United States Patent Office 3,497,059
Patented Feb. 24, 1970

3,497,059
PACKAGE AND METHOD FOR MAKING SAME
Ridley Watts, Jr., Cleveland, Ohio, assignor to
American Packaging Corporation
Continuation-in-part of application Ser. No. 591,495,
Nov. 2, 1966. This application Feb. 9, 1967, Ser.
No. 625,275
Int. Cl. B65d 73/00
U.S. Cl. 206—78                           20 Claims

ABSTRACT OF THE DISCLOSURE

Plastic pockets for card-type packages are formed with pleats or corrugations that at least partially encircle and define areas of the pocket that expand to receive an article to be packaged. A forming mold with a generally flat surface and undulations such as spaced grooves or raised portions forms pleats in a plastic film.

CROSS REFERENCE TO RELATED APPLICATION

This application is a continuation-in-part of copending application Ser. No. 591,495 filed Nov. 2, 1966, now abandoned.

BACKGROUND OF THE INVENTION

This invention relates to display packages and more particularly to a novel and improved package and a method and apparatus for making such package.

In present-day merchandising many articles are packaged in separate units. Retail products are often packaged in separate units in order to show the product attractively against a display background, which can contain artwork, illustrations of use, trademark, price, etc. Packages for separate units facilitate self-service sales, serve as protection in shipment, and deter pilferage.

In packages which accomplish this type of display, each unit of articles to be sold is mounted on an individual display card. The unit is covered with a transparent plastic material which fixes it to the display card. There are presently four principal commercially-available types of packages of this general construction. These four types are:

(1) A retail display package of the type sold under the trademark Polycard by American Packaging Corporation, Hudson, Ohio. This is the package which is described and claimed in greater detail in U.S. Patents 3,053,023 and 3,217,462, issued to Ridley Watts, Jr., on Sept. 11, 1962 and Nov. 16, 1965 respectively. In general, it is a card-type package with a flexible pocket preformed to the shape of the article to be packaged and which can be collapsed after forming for shipment or storage prior to loading.

(2) A second type of display package is the so-called "bubble" package. Here a cup is molded from a relatively heavy plastic sheet. This cup, known as a "bubble" or "blister" provides a relatively rigid pocket or cavity of sufficient size to receive the product to be displayed. The bubble is formed with a peripheral flange so that it can be attached to a display card.

(3) A third type of package is that in which an oversize pocket is formed. The product is inserted, and then the film is shrunk back by heat to conform to the product. The film generally used is a biaxially oriented polyvinyl chloride which will return to its original unmolded condition unless the pocket is formed shortly prior to the packaging operations.

(4) The fourth type of packaging of this general class is so-called "skin" packaging. Here a product is positioned on a porous supporting card, a plastic film is draped above the product and card and heat softened. The film, while heat softened, is forced by a pressure differential down onto the product and card.

SUMMARY OF THE INVENTION

The present invention relates to an improved package in which either a pliable or relatively rigid pocket is preformed with a pleat or pleats, especially continuous or overlapping patterns of pleats or corrugations. When pleats are formed in a flat film, the areas forming the pleats themselves are zones of reduced thickness. The pleats provide excess material in predetermined zones so that, upon expansion, a pocket is formed of predetermined shape. This shape is obtained by selective spacing and/or varying the depth and width of the pleats. To illustrate, the location of the pleats is analogous to the location of elevation lines on a topographical map. Each adjacent pleat adds additional depth and pleats close together will establish a steep wall or deep section to the pocket. The pleat or pleats must be contoured and arranged to extend about the area of the film that is to be expanded so that any straight line extending from one edge of the pocket to the other and through the area will intersect a pleat. Also, as to any point in the area a straight line from one side of the pocket to the other through the point to intersect a pattern which is effectively one pleat at two points. For example, a loop-shaped, C-shaped, or L-shaped pleat or corrugation bounds or partially bounds a flat uniformed or more shallow area of the pocket and provides for expansion.

A pleat acts in the nature of a spring allowing a portion of the membrane closing a card aperture to flex and form a pocket. If, for example, a membrane such as a plastic sheet or film is provided in which only one C-shaped pleat is formed, pressure on any point within an area bounded by the C and a line connecting the ends of the C will cause the portion of the membrane in the bounded area to move. Thus, the pleat, at least partially encircles an area of expansion in the membrane. This area of expansion, along with the pleat, forms the pocket. The remainder of the sheet covering the card aperture will act as an integral membrane which will remain flat. In this example, the line connecting the ends of the C acts as a hinge about which the bounded area pivots whenever pressure is applied to any point in that area. The limiting factor on the amount of movement of the bounded area is the extent to which the pleat can be deformed.

If two corrugations or pleats are formed which are, for example, crescent-shaped with portions overlapping, the two effectively act substantially as one C-shaped pleat. Here, the flexible area or area of expansion is an area which is bounded by the overlapping pleats and a line connecting the non-overlapped ends of the pleats. The limiting factor on the amount of flexing which can be obtained by pressure on a point within this bounded area is, in addition to the size and depth of the pleats, the amount a strip of film between the overlapped portions of the pleats can be distorted. The amount of overlap of the pleats may in turn affect the amount such a strip can be distorted. As used herein, a plurality of pleats in a membrane are "effectively one" pleat relative to the point being considered when they overlap each other so that no straight line extending from one side of the pocket to the other and through the point in the plane of the membrane can pass between two closely spaced corrugations of the plurality forming the pleat and not intersect any of such corrugations at any location along the line.

Similarly, a plurality of pleats can form effectively an endless pleat or loop.

Conversely to the above, any point which lies on a straight line that extends from one edge of the aperture to the other without intersecting any pleats is a point at which no flexure can be obtained, assuming the membrane closing the aperture is tightly drawn across that aperture. This is true because that portion of the membrane which lies along the line maintains its original dimension, preventing flexure along that line.

The plastic film closing the card aperture normally has some looseness to it so some small amount of flexure may be obtained at a point near, but outside of, a bounded area. Nonetheless, it is essentially correct to say flexure can be obtained at any point in the membrane covering the apertures to provide a pocket providing:

(1) It is possible to draw a straight line through the point which twice intersects one, or effectively one, pleat;

(2) It is not possible to draw a straight line across the aperture and through the point, which line does not intersect any pleat.

The present invention relates not only to an improved package, but also includes an improved mold and method of making the mold. The improved mold is especially useful in fabricating the first three of the above-listed types of packages and in all three cases results in an improved process for forming a package. In the case of the so-called blister or bubble package, an improved package results in which the bubble tightly holds the object being packaged.

One of the principal drawbacks that has been common to the first three of these listed types of packages is the time encountered and the expense of constructing molds suitable for forming the blisters, the pockets in the case of Polycard packages, and the over-formed pockets in the case of shrink packages. In a typical prior art practice a mold body with a cavity is first cast. The mold cavity is then machined smooth and polished. Working from a point on the smooth mold cavity as a reference, all six surfaces of the mold are then machined. Through trial and error the face of the mold is then machined until the cavity has the appropriate depth. This is obviously extremely time consuming and expensive. The fabrication of a male mold involves essentially the same problems.

The present invention utilizes a mold with spaced depressions or raised portions that expand the film in selected areas of the pocket so the pocket will expand to a desired contour. In the preferred form, a flat mold plate with improved mold cavities is used. The improved mold cavities preferably take the form of endless grooves formed in the face of the mold body. A profile milling machine will form suitable grooves. For example, one can utilize a tracer milling machine which follows a drawing. A drawing of the package to be formed is made and series of endless lines indicating the number of endless grooves to be formed, their shape and position, are made on the drawing. These endless lines are followed by the milling machine to mill a series of endless grooves in the mold. Vacuum holes are then drilled through the endless grooves. The pocket of a Polycard package, for example, is formed with such a mold by positioning a card with adhered film over the mold, heat softening the film, and drawing the film down onto the mold and into the grooves.

A pocket formed in this way has a number of advantages. As applied to a flexible pocket formed from film, the mold provides a programmed distribution of the material. Thus, one can determine just what parts of the pocket will be drawn thin by the molding operation and what parts will retain their original thickness. This, for example, provides the advantage that the outer part of the package can be a film of the original thickness, providing scuff resistance. In contrast, most prior art techniques produce a package where the outer part of the package is actually the thinnest because it has been drawn furthest as the film is drawn into a mold contoured at least partially to the shape of the object to be packaged. Of course, if one wishes the outer thickness to be somewhat thinner than the original thickness to enlarge the pocket, the surface of the present mold can be relieved, i.e., recessed, at a particular location such as within the area bounded by the grooves, so that certain portions of the film thickness in addition to the grooves will be thinner. Thus, the film thickness throughout the entire product is completely and accurately controlled.

Further advantages of this invention are the speed of making molds, the reduced cost of making them, and the great accuracy with which the groove contour and location can be determined to form a pocket of desired size and shape. These advantages attend the new construction in which grooves rather than a conventional cavity are used, which grooves are formed by rapid and accurate techniques. In addition to forming the grooves by milling, as mentioned, etching techniques can be used, such as photoetching or photogravure or the like.

If the package uses a film which has some heat shrink characteristics, such as a film sold commercially under the trademark Surlyn which is an ionomer film, the pocket can be heat shrunk after the package has been loaded to draw the film down over the product. This Surlyn film has a stability much like polyethylene in that it can be preformed and will hold its shape for an extended period of time. Surlyn films currently available afford less shrink than biaxially oriented polyvinyl chloride film but somewhat better shrink characteristics than polyethylene. Accordingly, a package formed by this process can be heat shrunk so that once the finished, loaded package is obtained, the pocket does not through visual inspection, appear any different than the best prior art flexible pockets. On the other hand, the pocket can be accurately formed to the finished shape and stretched taut without shrinking.

When the mold of this invention is used to form a rigid film pocket, often called a bubble or blister, all of the previously discussed advantages are obtained. In addition, for the first time a blister is provided that can be shipped flat. This avoids two of the principal prior disadvantages of blisters, namely the excessive space occupied during shipment on the tendency of the molded blisters to stick together if nested.

The blisters or rigid-type pockets formed in accordance with this invention are formed relatively flat, with pleats or corrugations formed in the wall area. The central area is then forced outward by a product when the package is loaded. This central area will be biased inward against the product by the pleated side wall, overcoming another principal disadvantage of prior art blister packages; namely, that of the product being loose within the blister.

Another advantage of packages formed by this invention is that the pockets or blisters formed have a more predictable pattern when in a collapsed condition, greatly facilitating card feed in automatic sealing equipment.

An illustration of one application in which molds formed by this invention produce a great advantage is in the packaging of nipples for baby bottles. It will be recognized that a plastic pocket or bubble adapted to hold a nipple must be quite deep. When made by conventional molds, avoidance of rupture of the plastic is quite difficult because of the depth to which the film must be made. Where a film of 10 mils thickness minimum has been required with prior art techniques for molding plastic pockets for nipples, it is, with this invention, quite possible to make very satisfactory pockets for nipples with films of three mils thickness. Accordingly, it will be recognized that another great advantage in the present mold is not just the improvement in the cost of making the mold but a great reduction in the cost of packages made with the mold.

It is therefore an object of this invention to provide novel and improved containers and packages and methods and apparatus for making molds, container, and packages.

Other objects and a better understanding of the invention will be obtained from the following description and claims taken in conjunction with the accompanying drawings.

BRIEF DESCRIPTION OF THE DRAWINGS

FIGURE 4 is a top plan view of a mold for forming pockets in plastic sheet material, constructed and arranged to form pockets in the window areas of the card of FIGURE 3;

FIGURE 5 is a plan view of the card of FIGURE 3 on the mold of FIGURE 4 showing the card after the window area has been formed into pockets;

FIGURE 6 is a partial sectional view of the mold of FIGURE 4, taken along the line 6—6 and looking in the direction of the arrows;

FIGURE 7 is a partial sectional view of the mold and packaging element of FIGURE 5, taken along the line 7—7 of FIGURE 5 and looking in the direction of the arrows;

FIGURE 8 is a longitudinal sectional view of a card with a formed pocket as shown in FIGURE 5, diagrammatically illustrating the manner in which an article is placed in a formed pocket and the card folded to enclose the article;

FIGURE 9 is a sectional view similar to FIGURE 8, illustrating the manner in which the pocket expands to cover the article as the card is closed;

FIGURE 10 is a sectional view similar to FIGURES 8 and 9 showing the package and article after the package is completely closed and sealed;

FIGURE 11 is a sectional view of the card of FIGURE 8 taken along the line 11—11 and looking in the direction of the arrows, illustrating the shape of the card in a transverse plane;

FIGURE 12 is a sectional view similar to FIGURE 11, taken along the line 12—12 of FIGURE 9;

FIGURE 13 is a sectional view of the card taken along the line 13—13 of FIGURE 10 showing the condition of the pocket and card after the card is closed about an article and sealed;

DESCRIPTION OF THE PREFERRED EMBODIMENTS

Figure 1:
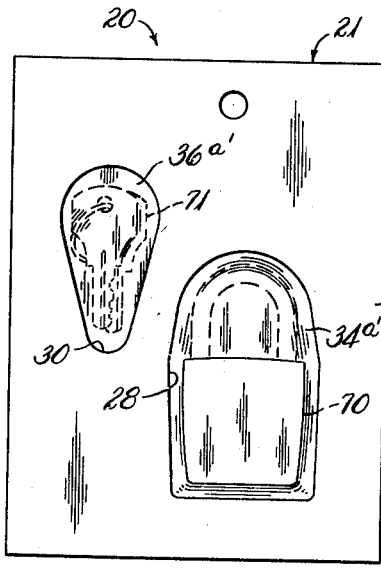
FIGURE 1 is a front elevation view of a preferred embodiment of a package constructed in accordance with this invention.
Figure 2:
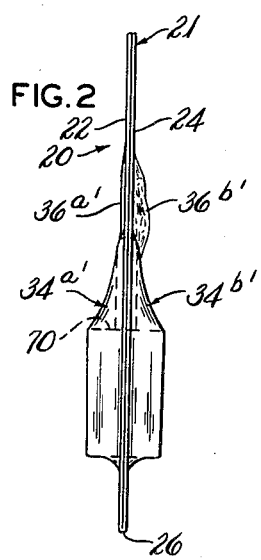
FIGURE 2 is a side elevational view of the package of FIGURE 1.

Referring now to the drawings, and particularly to FIGURES 1 and 2, a package 20 as shown formed from a stiffening structure indicated generally at 21. The stiffening structure 21 is a fold-over card formed of two panels 22, 24 defined by a fold line 26. The panel 22 forms a front face of the package and the panel 24 forms a back face. The stiffening structure 21 and panels 22, 24 are shown flat in FIGURE 3, before the pockets have been formed.

In the embodiment shown, the stiffening structure 21 is rectangular and the front and back panels 22, 24 are of equal size. Two apertures 28a, 30a are formed in the front face panel 22, spaced from the fold line 26. Matching apertures 28b, 30b, respectively, are formed in the back face panel 24 correspondingly located so that when the card 21 is folded about the line 26 and the face panels placed against each other, the apertures 28a, b and 30a, b are brought into registration with each other, forming two apertures 28, 30 through the package 20. Alternatively, separate front and back panels can be used.

The bisecting fold line 26 is preferably a weakened line. It can be formed of spaced cuts, as shown, or can be a continuous partial cut, an embossed impression, or the like.

A sheet of pliable film 32 is bonded to the back surface of the card 21 (in the orientation of FIGURE 3), which is the inside surface when the card is folded and sealed as in FIGURES 1 and 2. The sheet or film 32 is bonded across the apertures 28a, b and 30a, b, forming flat windows 34a, b across the apertures 28a, b and windows 36a, b across the apertures 30a, b. Pockets will be formed in these windows to accommodate an article to be packaged, in a manner to be described subsequently.

The film or sheet of plastic material 32 is bonded to the stiffening structure 21, as by a wet or softenable adhesive. The sheet material is preferably heat sealable so that the face panel portions 22, 24 can be conveniently adhered together in opposed relationship by portions of the sheet or film 32 that extend about the apertures. Alternatively, the inner surfaces of the face portions of the card can be coated with an adhesive, such as a heat bondable adhesive.

Pockets suitable for containing a particular article are formed in the portions of the sheet or film 32 that form the windows 34a, b and 36a, b. The film 32 has properties that facilitate this forming. In the embodiment shown, the film is an ionomer film sold under the trademark, Surlyn. It is thermoplastic, dimensionally stable at room temperature and capable of being heat shrunk to a limited extent. Other films, such as polyethylene or biaxially oriented polyvinylchloride film may also be used and, as will be described in more detail in connection with a further embodiment, a relatively stiff thermoplastic film can be also used. Where polyethylene film is used, the film is maintained taut primarily through a tension fit resulting from the formed shape, rather than through shrinking.

Each of the windows 34a, b and 36a is formed in predetermined areas to enlarge the total area of the window and form a pocket capable of extending over a three dimensional article to be packaged in the folded card 21. In the embodiment shown, the window 36b is not formed because the article to be located in the apertures 30a, 30b extends only from the front face panel 22 of the finished package 20.

A mold 40, as shown in FIGURE 4 is used to form the areas 34a, b and 36a. The mold 40 includes a body 42 having a rectangular periphery 44 that corresponds to the shape of the card 21, and a flat face 46 for receiving the card 21 in overlying relationship.

Figure 3:
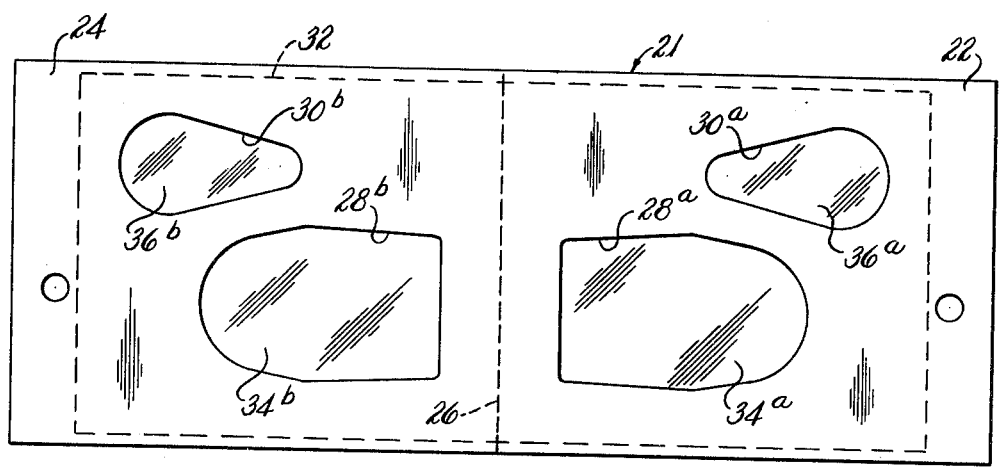
FIGURE 3 is a plan view of a card for forming the package of FIGURES 1 and 2, shown before pockets are formed.

Three different grooved areas 50, 51, 52 are formed in the flat face 46 of the mold 40 in locations that correspond to the location of the apertures 28a, 28b, and 30a, respectively. These grooved areas will therefore underlie the windows 34a, 34b and 36a of the thermoplastic film or sheet 32 when the card 21 as shown in FIGURE 3 is placed over the mold 40 with the edges of the card aligned with the rectangular periphery 44 of the mold, as shown in FIGURE 5.

The grooves in areas 50 and 51 are identical, but arranged in mirror image relationship about the fold line and only the grooves of set 50 will be described in detail. Only one groove is provided in the area 52 in this embodiment because only a shallow pocket need be formed. The one groove is also shaped differently from the grooves in areas 50 and 51, but the construction is otherwise identical.

As best shown in FIGURES 4 and 6, the set of grooves indicated at 50 consists of an outer groove 55, an inner groove 56, and an intermediate groove 57. Each of these grooves is in the form of an endless loop and each is spaced from the others so that the grooves are not interconnected. The outer groove 55 is essentially in the shape and size of the aperture 28a, as is evident from FIGURE 5. It is located just within and beneath the periphery of the aperture 28a. The grooves 55, 56, 57 form separate surface areas 46a, 46b, and 46c in the flat face surface 46 of the mold 40. Each groove 55, 56, 57 includes a plurality of small openings or apertures 60 at spaced locations about the grooves. These apertures communicate with a source of vacuum applied through a channel or channels (not shown) formed within the body of the die 40.

To form the film 32 in the areas of the windows 34a, 34b and 36a, the card 21 is placed over the die 40 as shown in FIGURE 5. The film is heated to a softening temperature for forming either before the card is placed upon the die or after. A vacuum is drawn within the grooves 55, 56 and 57, drawing the heated sheet or film of thermoplastic material 32 into the grooves, as illustrated in FIGURE 7. This stretches the material 32 that is drawn into the grooves 55, 56, 57 and forms spaced endless pleats or corrugations 65, 66, 67 in the material, which pleats are reduced in thickness from the original thickness of the sheet 32. The portion of the sheet 32 adhered to the stiffening structure 21, as well as portions 32a, 32b, and 32c lying on the surfaces 46, 46a, 46b and 46c of the mold remain of the original thickness. As a result of this forming operation, the window areas 34a, 34b, 36a are transformed into preformed pockets, two of which are shown in FIGURES 8 to 13 and indicated at 34a' and 34b'. When the pocket is expanded the pleats end up as bands or areas of reduced thickness in the pocket.

If desired, a compressed air mold can be used instead of a vacuum mold. It will also be apparent from the configuration of the pocket that ridges could be used extending from a flat surface of a mold body in lieu of groove-like depressions to produce spaced bands of reduced thickness, although the die would be more difficult to produce. In addition, because the depressions are shallow, mated molds can be used to form the material in the manner of a stamping.

The number of grooves as well as the location, spacing and width of the grooves determines the ultimate shape of the cavity or pocket. For example, the three grooves in each area 50, 51 for forming the pockets 34a' and 34b' stretch the film a substantial amount so that when the pocket is expanded it will form a relatively deep pocket for a large article. On the other hand, only a single groove 68 is provided in the area 52 used to form the window 36. The film is therefore stretched a small amount to provide a shallow pocket 36a' (see FIGURE 2). By programming the number, size, shape and location of the grooves within a given window area, the exact shape and thickness of any portion of film is accurately controlled and the pocket can be shaped to a wide variety of contours to fit the particular article to be packaged. In the embodiment shown, the grooves of the mold 40 shape the pockets 34a' and 34b' to accommodate a padlock 70. The pocket 36a' is shaped to accommodate keys 71, which are relatively flat.

To assure a pocket of the proper size and shape, the shape, size and location of the forming grooves indicated at 50, 51 and 52 can be calculated and the grooves then accurately formed, as by milling or photo-etching the grooves into the face surface 46. Modern techniques permit the control of a milling machine from a drawing on which the grooves have been plotted. The drawing is used to program the milling machine to mill corresponding grooves in the mold. With photoetching techniques, the grooves can be formed essentially by conventional plate making processes as used in the printing field, whereby metal is selectively removed by etching in selected areas and to selected extents. Because the construction of the grooves can be calculated mathematically to achieve the necessary accuracy for forming the pockets, a finished die can be economically and accurately produced that will form a window into a pocket with selected areas of predetermined thickness and shape so that when expanded the pocket closely corresponds to the shape of the article to be packaged. Not only can the die be accurately formed, but also with the present construction the amount of material removed from the die to form the cavity is kept to a minimum. As illustrated in FIGURE 4, the grooves 55, 56 and 57 all lie in the same plane of the mold body, yet each groove and the surrounded area represents in the finished pocket a portion that is displaced from the plane of the surrounding sheet portion 32. Thus, a deep pocket is provided without removing a corresponding amount of metal from the die. This eliminates the need for expensive patterns, reversals, and polishing that is necessary to accurately shape large areas of complex contours required with cavity molds of the type presently known and used.

FIGURES 8 to 13 illustrate the manner in which the formed pockets 34a', 34b' expand to encompass the article 70 as the face panels 22, 24 are folded together over the article. As diagrammatically illustrated the portions 65, 66 and 67 of thinner material formed into grooves or pleats deform, as by straightening out to allow the pockets to expand. The resulting shape depends upon the relative degree to which different areas have been stretched and the shape of the grooves. As shown in FIGURES 10 and 13, the pockets 34a' and 34b' are pulled taut about the article 70, the film forming the pocket being slightly in tension. If desired, the pocket may be heat shrunk somewhat to improve the tension and appearance of the package. Shrinking will completely remove any of the undulations or wrinkles that form the pleat initially. The pocket is preferably transparent to display the product. Also, as diagrammatically illustrated in FIGURES 8 to 13, a central portion 32c of the film forming each pocket and farthest removed from the plane of the card is of the original thickness because it was not stretched by the grooves of the mold. This central portion covers that part of the article 70 that extends farthest from the plane of the associated card panel. As a result, the portions of the film forming the pocket that will be most susceptible to abrasion and damage are of the original thickness and can best withstand such abrasion. In this same manner, the film over corners or other specific zones can be kept strong.

FIGURES 8 to 13 also illustrate that the expansion of the pockets 34a' and 34b' is three dimensional, since the bands of thinner material 65, 66 and 67 encircle the article. The expanded pleats 65, 66 and 67 as well as the encircled areas 32a, 32b and 32c are displaced from the plane of the front and back face panels 22, 24 when the card is closed about the article 70. However, prior to loading, only the small corrugated portions 65, 66 and 67 extend from the plane of the card so that the pocket in collapsed condition is quite flat, facilitating shipment with a minimum of space prior to loading.

With reference to FIGURES 14 to 19, an improved blister type package is shown and indicated generally by the reference numeral 80. The package 80 is formed of two stiffening members in the form of a back panel 82 and face panel 84. While shown as separate panels, it will be understood that the panels could be joined along one edge and folded in a manner similar to the embodiment previously described and shown in connection with FIGURES 1 to 13. The face panel 84 has a central aperture 86. A bubble or blister 88 extends through the aperture 86 from the plane of the face panel 84. A surrounding flange portion 89 of the blister 86 is sandwiched between the back panel 82 and face panel 84 to retain the blister 88 in position. Preferably, the blister 88 is adhered by a suitable adhesive or by a heat seal to the inside surface of the face panel 84. The face panel 84 and back panel 82 are in turn adhered together about the periphery of the blister, as by a suitable adhesive, such as a heat bondable adhesive.

The bubble or blister 88 is initially formed of a relatively heavy or thick thermoplastic sheet and, if formed and maintained in substantially the original thickness, is not flexible or pliable in the sense that the pocket in the previously described embodiment is flexible.

Figure 15:
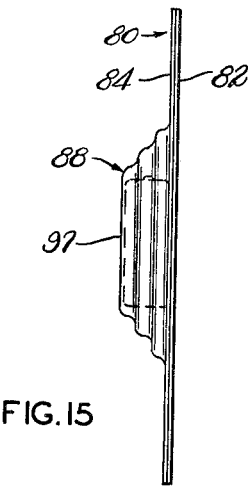
FIGURE 15 is a side elevational view of the package of FIGURE 14.
Figure 16:
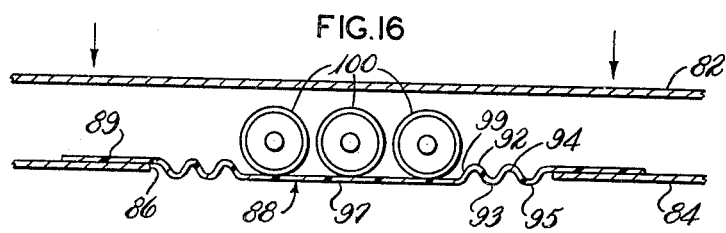
FIGURE 16 is a diagrammatic sectional view of the package of FIGURE 14 showing the formed blister in a flat condition with the package partially opened and being closed.
Figure 17:
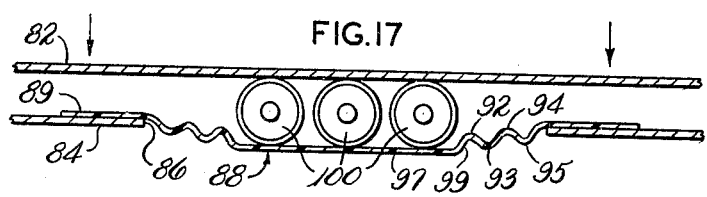
FIGURE 17 is a sectional view similar to FIGURE 16, illustrating the manner in which the article being packaged expands the pocket as the package is closed.
Figure 18:
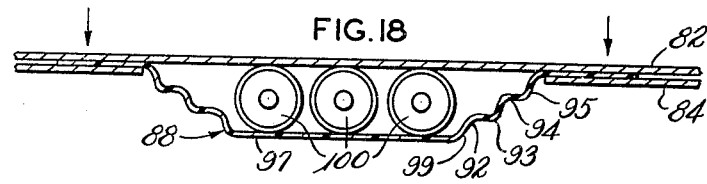
FIGURE 18 is a sectional view similar to FIGURE 17, showing the package after it has been closed and sealed, illustrating the manner in which the pocket or cavity is biased against the product or articles packaged, to hold the articles tightly within the pocket.

In accordance with this invention, flexible zones are provided in the bubble 88 of the package 80 by forming the bubble with a mold of spaced endless grooves constructed as described in connection with FIGURE 4. Thus, the bubble 88 of FIGURE 15 is initially shaped in the form shown in FIGURE 16, i.e., in a flattened condition. The bubble 88 includes spaced endless bands or zones 92, 94 of the original thickness of the thermoplastic sheet material that forms the blister, and alternate bands 93, 95 and 99 where the material is substantially thinner. These bands are formed by depressed surfaces such as grooves in a mold as already described and in being so formed are stretched to a substantially thinner thickness than the original dimension. In the embodiment shown, a central recessed area 97 is also formed, as by a shallow recess in the central area of the mold. Because the central area 97 is essentially flat and very shallow, only the surrounding wall portion 99 has stretched to a substantially thinner dimension. Alternatively, the central area 97 can be maintained in the original plane of the film, as in the embodiment previously described. However, the configuration shown in FIGURE 16 is convenient because the recessed surface 97 holds articles 100, shown for purposes of illustration as batteries, in proper location as the package is being assembled. The spaced bands of thinner areas 93, 95 and 99 permit the otherwise relatively rigid bubble 88 to be distorted and expanded to a substantial depth as the central portion 97 is forced from the original plane of location by the articles 100 and the force applied to the back panel 82, as illustrated by the arrows in FIGURES 16 to 18.

Figure 19:
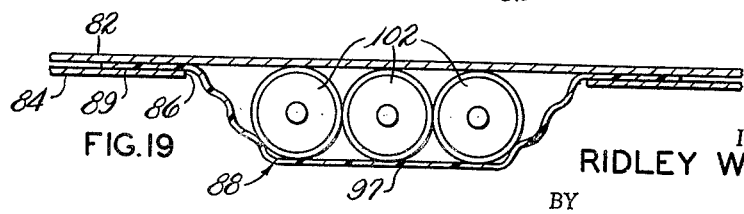
FIGURE 19 is a sectional view similar to FIGURE 18, showing the package with larger articles, illustrating the manner in which the expansible pocket or cavity can be used with articles of different sizes.

As is characteristic with bubble or blister type packages, the bubble 88 does not fit tightly about the articles 100. However, with the present construction, movement of the articles is retarded by the wall portion 99 and, more importantly, the central portion 97 is biased against the articles 100 by the resilience of alternate bands 93, 95 and 99 that have been flexed and which are under tension. In addition, as shown in FIGURE 19, the same blister 88 can be used to package articles of different sizes, such as larger batteries 102, by applying sufficient force to further distort the alternate bands 93, 95 and 99 so that the central portion 97 is further displaced from the plane of the back panel 82 and front panel 84.

Figure 14:
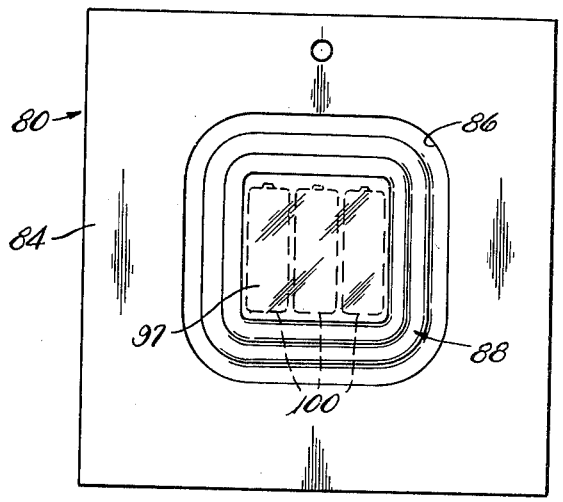
FIGURE 14 is a front elevational view of a second embodiment of a package constructed in accordance with this invention, wherein a so-called blister type container is formed with grooves to facilitate expansion of the pocket.

In manufacturing cards in accordance with this invention, and with reference to the embodiment of FIGURES 1 and 2 as well as the embodiment of FIGURES 14 and 15, a mold is produced by accurately forming grooves in the surface of a mold body, locating and constructing the grooves to provide a pocket or cavity that can be expanded to a desired final shape. In the case of a card having a plastic sheet or film adhered directly to the card and extending over an aperture, the portion of the film over the aperture is heated to a softened condition and the card is placed over the mold with the window portion or portions located over the grooves that form the cavity or pocket. A vacuum is drawn through the grooves and portions of the sheet or film align over the grooves are forced by differential pressure into the grooves. This stretches those portions of the thermoplastic material that overlie the grooves, reducing the thickness of the film and increasing the area in selected zones. The sheet or film is then cooled and the card removed from the mold. The pocket is relatively flat in this condition and can be shipped utilizing a minimum of space. When an article is placed between the front and back panels of the card and the panels closed about the article, the article expands the preformed pocket. The manner in which the preformed pocket expands is controlled by the distribution of the sheet material, as formed by the grooves of the mold.

The formation of the blister or bubble 88 of the package of FIGURES 14 and 15 is substantially the same, except that the blister is often formed while separate from the panels 82, 84 of the card 80. When this is the case, it is shipped to the customer after being formed, and in relatively flat condition. It is then inserted by the customer into a front panel 84, with the formed portion of the blister extending through the aperture 86, and sealed to the panel. In the past, rigid blisters have been shipped nested and they have caused considerable problems by sticking together, making their use in automatic machinery difficult. This problem is eliminated with the bubble of the present invention because it is shipped flat. When an article is then placed within the bubble or blister 88 and the back panel 82 forced into contact with the face panel 84, the articles expand the blister. At the same time, the inherent resilience of the thinner zones of the blister maintains a biasing force against the articles, holding them in tight relationship with the back panel and the front face of the blister.

One particular advantage in connection with the pliable pockets of the embodiment of FIGURES 1 and 2 is attained in connection with automatic packaging operations. As can be appreciated, a pocket expanded to a large extent throughout and randomly collapsed may overlap the edges of the aperture and in some cases interfere with the mechanism used to transport the cards from a loading to a sealing station. In contrast, the preformed pockets of the present invention are expanded only in spaced zones which are maintained in their formed locations by the stiffer unformed portions so that the excess material in the collapsed condition is in a predetermined location, within the confines of the aperture. As a result, there is no opportunity for the formed pocket to intefere with the conveying or feeding mechanisms of automatic machinery.

In the embodiments disclosed the formed pocket or cavity has two or more areas of different thickness. These areas will be in the form of endless bands of alternately thinner and thicker film when the pleats are endless corrugations. The thinner portions are those areas formed into pleats or corrugations. In some cases, partial curved or L shaped pleats may be used alone or with endless pleats to attain the desired contour of the pocket. Also additional shaping of surfaces bounded by grooves of the mold will provide a different shape and thickness of the pocket. For example, within the central groove 56 shown in FIGURE 4 of the drawings, the surface can be recessed to provide additional depth rather than being at the level of the face 46. In this manner, a central dome shape can be established in a pocket to provide a contour and depth that will facilitate a central protrusion on an article being packaged. In general, an area forming a pleat or corrugation forms an area thinner than the thickness of the film surrounding the pocket. Such surrounding film is normally of the original thickness. An area of expansion within, i.e., at least partially encircled by, the pleat is at least as thick as the pleat but no thicker than the film surrounding the pocket. Normally, the expansion area encircled or partially encircled by the pleat will be thicker than the film of the pleat and typically it will be approximately the original film thickness.

This invention includes embodiments in which the pocket is formed by initially producing a film with pleats, as by extruding a flowable thermoplastic film onto a mold surface having undulations such as ridges or grooves in the form of the corrugations or pleats desired. The film is then cooled to a temperature at which it is dimensionally stable. The excess surface area forming the pleat or pleats affords predetermined expansion of the pocket so that the film will form a desired shape when an article is packaged.

Figure 20:
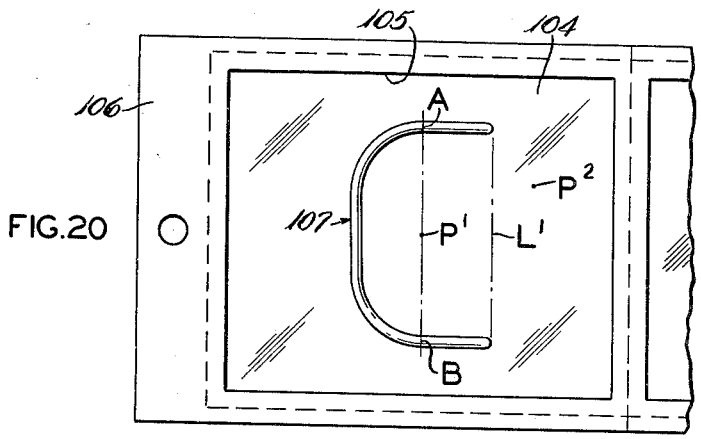
FIGURE 20 is a partial plan view of a card and formed window area having a single C-shaped pleat and diagrammatically illustrating the area of pocket expansion.
Figure 21:
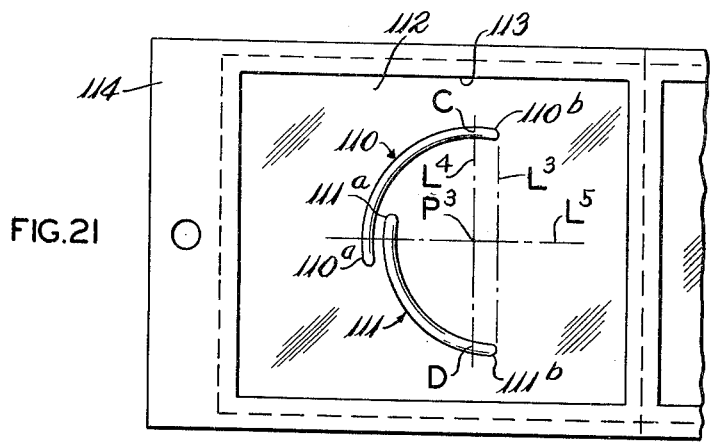
FIGURE 21 is a partial plan view similar to FIGURE 20 showing two curved pleats that are effectively a single pleat.
Figure 22:
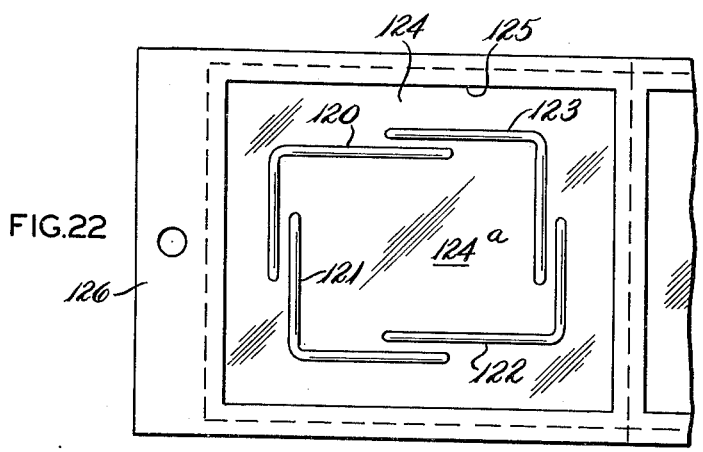
FIGURE 22 is a partial plan view similar to FIGURE 20 showing four L-shaped pleats forming effectively an endless pleat.

Variations in shapes of pleats or corrugations formed in the pocket area of containers are shown in FIGURES 20 to 22 of the drawings. Those figures diagrammatically illustrate locations on the film forming the pocket at which flexure can occur due to the shape and location of the pleats or corrugations.

As shown in FIGURE 20, a film 104 extends across an aperture 105 in a card 106. A C-shaped corrugation or pleat 107 is formed in the film 104 in the same manner as the endless pleats 65, 66, 67 are formed in the container of FIGURE 7. An imaginary straight line L1 is diagrammatically shown connecting the opposite ends of the C-shaped pleat 107. Any point on the film 104, such as a point P1, bounded by the pleat 107 and the line L1 is within a zone of the film that will flex to expand the pocket when pressure is applied. This is because (1) a line, diagrammatically indicated as line L2 can be drawn through the point P1 or any other point in the zone and intersect the pleat 107 at two places, for example, at A and B, and (2) no straight line can be drawn through point P1 across the aperture 105, without intersecting the pleat 107.

A point P2 is shown on the opposite side of the line L1 from the point P1. No straight line can be drawn through the point P2 and intersect the pleat 107 at two locations. Accordingly, the point P2 is not on a portion of the film 104 that will flex or expand.

FIGURE 21 illustrates two crescent shaped pleats 110, 111 in a film 112 across an aperture 113 of a card 114. These pleats can function in a similar manner to the single pleat 107 of FIGURE 20. An inner end 110a of pleat 110 and an inner end 111a of pleat 111 overlap each other. Opposite ends 110b and 111b are spaced apart and an imaginary line L3 is shown connecting the spaced ends. A point P3 is diagrammatically illustrated within the confines of the pleats 110, 111 and the line L3 connecting the spaced ends. A straight line L4 drawn through the point P3 intersects the pleat 110 at a location C and intersects the pleat 111 at a location D. Moreover, any line, such as the imaginary line L5, drawn through point P3 and extending across the aperture 113 intersects one or both of the pleats 110, 111. Accordingly, P3 lies in a zone that is capable of flexing to expand the pocket. The two pleats are effectively one pleat with respect to point P3 and other points in the zone or area of flexing.

A modified embodiment is shown in FIGURE 22, in which four overlapping L-shaped pleats 120, 121, 122, 123 are formed in a film 124 across an aperture 125 in a card 126. As shown, adjacent ends of the different L-shaped pleats overlap each other so that the four pleats together enclose a central area 124a that will flex to expand the film into a pocket, since a straight line across the aperture 125 through any point within the area 124a must intersect one or more of the pleats 120–124 at two locations. Other variations will, of course, be apparent.

While preferred embodiments of the present invention have been described in detail, it should be understood that such description is by way of illustration, and that various modifications and alterations may be made without departing from the spirit and scope of the invention.

What is claimed is:
1. A container for packaging a product comprising:
   (a) a panel having front and back faces and a through aperture;
   (b) a flexible membrane having one section secured to one face of the panel and another section closing said aperture;
   (c) said membrane other section having a pleat means formed therein of a contour and size that facilitates distortion of the membrane to a predetermined shape that substantially conforms to the contour of a product to be covered by said membrane;
   (d) said pleat means comprising pleat portions projecting from the plane of the remainder of the membrane and the aperture;
   (e) said pleat portions at least partially encircling an area of expansion such that as to any point within said area;
      (i) at least one imaginary straight line exists which extends through a selected point across said aperture and twice intersects pleat portions which are effectively in one pleat; and
      (ii) any imaginary straight line through the selected point and extending across the aperture intersects said portions effectively forming one pleat at least once;
   (f) said flexible membrane, including said pleat portions, being soft and pliable enough to readily collapse from a preformed shape to a substantially flattened condition and to readily expand when pressure is applied at any point in the area of expansion, said pleat portions essentially disappearing through distortion when such pressure is applied to form with the area of expansion a product receiving pocket greater in volume than said preformed shape and which substantially conforms to contours of a received product; and,
   (g) the thickness of said area of expansion being at least as thick as said pleat portions and being no thicker than said one section.

2. The container of claim 1 wherein there are parts of said other portion external of said pleat means and areas of expansion which remain substantially in the plane of the aperture on formation of a pocket.

3. The container of claim 2 wherein said parts external of the pleat means and area of expansion are thicker than the pleat means.

4. The container of claim 3 wherein the parts external of the pleat means and areas are in the shape of an endless band surrounding the pleat means and said area of expansion.

5. The container of claim 1 wherein said area of expansion is thicker than said pleat portions.

6. The container of claim 1 further including a second panel adapted to be secured to the back face of said first-mentioned panel and with parts adapted to form with said flexible membrane a closed pocket for an article.

7. A container for packaging a product comprising:
   (a) a panel having front and back faces and a through aperture;
   (b) a flexible membrane secured to one face of the panel and closing said aperture;
   (c) said membrane having a plurality of effectively endless pleats formed therein of a contour and size that facilitates distortion of the membrane to a predetermined shape that substantially conforms to the contour of a product to be covered by said membrane;

(d) said pleats projecting from the plane of the remainder of the membrane and the aperture;

(e) each of said effectively endless pleats encircling an area of expansion;

(f) one of said effectively endless pleats encircling another of said effectively endless pleats; and (g) said flexible membrane, including said pleats, being soft and pliable enough to readily collapse from a preformed shape to a substantially flattened condition and to readily expand when pressure is applied at any point in the area of expansion, said pleats essentially disappearing through distortion when such pressure is applied to form with the area of expansion a product receiving pocket greater in volume than said preformed shape and which substantially conforms to contours of a received product.

8. The container of claim 7 wherein the membrane in said areas of expansion is thicker than the pleat portions.

9. A container for packaging a product comprising:
 (a) a panel having front and back faces and a through aperture;
 (b) a flexible membrane having one section secured to one face of the panel and another section closing said aperture;
 (c) said membrane other section having a pleat means formed therein of a contour and size that facilitate distortion of the membrane to a predetermined shape that substantially conforms to the contour of a product to be covered by said membrane;
 (d) said pleat means comprising pleat portions projecting from the plane of the remainder of the membrane and the aperture;
 (e) said pleat portions at least partially encircling an area of expansion such that as to any point within said area:
  (i) at least one imaginary straight line exists which extends through a selected point across said aperture and twice intersects pleat portions which are effectively in one pleat; and
  (ii) any imaginary straight line through the selected point and extending across the aperture intersects said portions effectively forming one pleat at least once;
 (f) said flexible membrane, including said pleat portions, being soft and pliable enough to readily collapse from a preformed shape to a substantially flattened condition and to readily expand when pressure is applied at any point in the area of expansion, said pleat portions essentially disappearing through distortion when such pressure is applied to form with the area of expansion a product receiving pocket greater in volume than said preformed shape and which substantially conforms to contours of a received product;
 (g) said portions having spaced remote ends; and
 (h) the expansion of the membrane in the area of expansion being substantially about a hinge line extending from one remote end to the other.

10. A package comprising:
 (a) a card having a through aperture;
 (b) a plastic membrane having a peripheral portion of essentially uniform thickness secured to the card about the aperture and a central portion closing the aperture;
 (c) the membrane central portion including a pocket extending through the aperture;
 (d) an article in said pocket; and,
 (e) said pocket having a central area of a thickness essentially equal to that of the peripheral portion of the membrane and another area at least partially surrounding the central area of the pocket of lesser thickness than the central area.

11. The package of claim 10 including a panel with portions secured to the card about the aperture and with portions extending across the aperture, closing the pocket that extends through the aperture and retaining the article in the pocket.

12. The method of forming a package with a panel having front and back faces and a through aperture comprising the steps of:
 (a) securing one section of a flexible membrane to one face of the panel with another section of the membrane closing said aperture;
 (b) forming in said other section a plurality of pleats with portions projecting from the plane of the remainder of the membrane and at least partially encircling an area of expansion such that as to any point within said area:
  (i) at least one imaginary straight line exists which extends through a selected point across said aperture and twice intersects said pleat portions which are effectively in one pleat; and,
  (ii) any imaginary straight line through the selected point and extending across the aperture to intersect said portions effectively forming one pleat at least once; and
 (c) inserting a product into a pocket formed by passing the product at least partially through the aperture and pressing the product against said expansion area to move said expansion area and the pleat outwardly from the plane of the aperture and distend said expansion area and pleat into a predetermined contour at least partially conforming to that of the product being inserted therein and in which contour the pleat essentially disappears.

13. The method of claim 12 including the step of at least partially closing the back of said aperture to retain the product in the pocket.

14. The method of claim 12 wherein said pleat portions are formed to provide a plurality of effectively endless pleats with one of said effectively endless pleats around the other and both encircling the area of expansion.

15. A method of forming a package with a panel having front and back faces and a through aperture comprising the steps of:
 (a) securing one section of a flexible membrane having heat-shrink characteristics to one face of the panel with another section of the membrane closing the aperture,
 (b) forming in said other section a pleat that at least partially bounds an area of expansion of the membrane and in which pleat the thickness of the membrane is less than the thickness in the area at least partially bounded thereby,
 (c) inserting a product into a pocket formed by passing the product at least partially through the aperture and pressing the product against said expansion area such that said expansion area and the pleat are moved outwardly from the plane of the aperture to distend said expansion area and pleat into a contour at least approximating a portion of the product being inserted therein, and
 (d) applying heat to the membrane sufficient to shrink the membrane to the extent of completely removing undulations or wrinkles forming the pleat.

16. An article for packaging a product, comprising a face panel, an aperture in the face panel, a back panel, a pocket formed of relatively stiff plastic sheet material having a smooth central area and a plurality of peripherally located pleats thinner than said central area and a planar flange surrounding the pleats, said pocket extending through the aperture in said face panel and said flange and back panel adhered to the face panel, said pleats being resilient to permit the central area of the sheet material to be substantially displaced from the plane of the flange, and an object within the pocket, said pocket being expanded and biased against the object within.

17. A container comprising:
 (a) a card having a through aperture;

(b) a plastic membrane having a peripheral portion of essentially uniform thickness secured to the card about the aperture and a central portion closing the aperture;

(c) the membrane central portion including a pocket-forming portion with a formed pleat portion at least partially encircling an area of the central portion; and 18. A method of forming a sheet of thermoplastic material to provide a portion that is expandable to a greater volume than that of a formed portion of the sheet, the steps comprising:

(a) supporting the sheet of thermoplastic material in a reference plane, (b) heating at least a portion of the sheet to a softening temperature at which it can be molded, (c) stretching a heated portion of the sheet to mold it into a groove-shaped configuration that projects from the reference plane and at least partially encircles a significant area of the sheet to form with the at least partially encircled area a sheet portion expandable to a substantially greater volume than that of the molded portion to form a pocket for receiving an article to be packaged, while (d) maintaining other portions of the sheet that are at least in part encircled by the groove-shaped portion in the reference plane and at the original sheet thickness, (e) said portion stretched into the groove-shaped configuration being surrounded by portions of the sheet maintained in the reference plane, (f) cooling the sheet, and (g) expanding the pocket by displacing the area of the sheet that is at least partially bounded by the groove-shaped portion from its formed location relative to the surrounding portions of the sheet maintained in the reference plane during forming and deforming the groove-shaped configuration.

19. The method of claim 18 wherein the pocket is expanded with an article being packaged.

20. A method of forming a sheet of thermoplastic material to provide a portion that is expandable to a greater volume than that of a formed portion of the sheet, the steps comprising:

(a) supporting the sheet of thermoplastic material in a reference plane, (b) heating at least a portion of the sheet to a softening temperature at which it can be molded, (c) stretching a heated portion of the sheet to mold it to form a plurality of groove-shaped configurations spaced from each other and forming effectively an endless pleat that surrounds a portion of the sheet to form with the surrounded portion a sheet portion expandable to a substantially greater volume than that of the molded portion to form a pocket for receiving an article to be packaged, while (d) maintaining other portions of the sheet that are surrounded by the groove-shaped configurations in the reference plane and at the original sheet thickness, (e) said portion stretched into the groove-shaped configurations being surrounded by portions of the sheet maintained in the reference plane, (f) cooling the sheet, and (g) expanding the pocket by displacing the surrounded area of the sheet and distorting the groove-shaped configurations with an article being packaged.

References Cited

UNITED STATES PATENTS

| | | | |
|---|---|---|---|
| 3,270,104 | 8/1966 | Dreyfus et al. | 264—92 |
| 3,267,635 | 8/1966 | Stoker | 53—30 |
| 3,054,503 | 9/1962 | Hartman et al. | 206—78 |
| 3,057,537 | 10/1962 | Pollick | 220—66 X |
| 3,173,540 | 3/1965 | Lapides | 206—78 |
| 3,198,681 | 8/1965 | Watts | 206—78 X |
| 3,220,544 | 11/1965 | Lovell | 220—8 X |
| 3,299,604 | 1/1967 | Kraut | 206—78 X |

FOREIGN PATENTS

| | | |
|---|---|---|
| 1,431,684 | 2/1966 | France. |
| 972,325 | 10/1964 | Great Britain. |

MARTHA L. RICE, Primary Examiner

U.S. Cl. X.R.

53—30; 206—45.31; 264—92, 296

PO-1050
(5/69)

UNITED STATES PATENT OFFICE
CERTIFICATE OF CORRECTION

Patent No. 3,497,059    Dated February 24, 1970

Inventor(s) Ridley Watts, Jr.

It is certified that error appears in the above-identified patent and that said Letters Patent are hereby corrected as shown below:

Column 15, Claim 17, subparagraph "(d)" should be added:

-- (d) said at least partially encircled area of the pocket-forming portion having a thickness substantially equal to that of the peripheral portion of the membrane and said pleat portion being of less thickness than the at least partially encircled area. --

SIGNED AND
SEALED
AUG 18 1970

(SEAL)
Attest:

Edward M. Fletcher, Jr.
Attesting Officer

WILLIAM E. SCHUYLER, JR.
Commissioner of Patents